United States Patent

Helland

[11] Patent Number: 4,872,547
[45] Date of Patent: Oct. 10, 1989

[54] CLAMPING MEANS FOR ATTACHING THE ENDS OF A CONVEYOR COIL SPRING TO A JOURNAL PIN

[76] Inventor: Ingolv Helland, N-4330, Algard, Norway

[21] Appl. No.: 195,003

[22] Filed: May 17, 1988

[30] Foreign Application Priority Data

May 21, 1987 [NO] Norway ................................ 872136

[51] Int. Cl.⁴ .............................................. B65G 33/26
[52] U.S. Cl. ...................................... 198/659; 403/229
[58] Field of Search ........................ 198/659, 674, 677; 403/229

[56] References Cited

U.S. PATENT DOCUMENTS

| 307,275 | 10/1884 | Edmondson | 198/659 |
| 450,018 | 4/1891 | Hopcraft | 198/659 X |

FOREIGN PATENT DOCUMENTS

| 1000282 | 1/1957 | Fed. Rep. of Germany | 198/659 |
| 2626196 | 6/1976 | Fed. Rep. of Germany | |
| 2701772 | 1/1977 | Fed. Rep. of Germany | |
| 375962 | 5/1975 | Sweden | |
| 1362690 | 12/1987 | U.S.S.R. | 198/659 |

Primary Examiner—Robert J. Spar
Assistant Examiner—Cheryl L. Gastineau
Attorney, Agent, or Firm—Browdy and Neimark

[57] ABSTRACT

A device for attaching the ends of a conveyor coil screw, e.g. to a journal pin in a bearing at the end of the conveyor tube of a screw conveyor. A clamping sleeve with inner walls converging from opening in the direction of the other end of clamping sleeve is secured to jounal pin. A wedge shaped clamping member to be inserted into clamping sleeve is secured to a screw bolt at its narrow end. The screw bolt extends through and projects outside an axial bore in journal pin and is provided with a nut at its free end. Clamping sleeve and clamping member together form an annular space to receive and hold end of conveyor coil spring when nut is tightened.

4 Claims, 1 Drawing Sheet

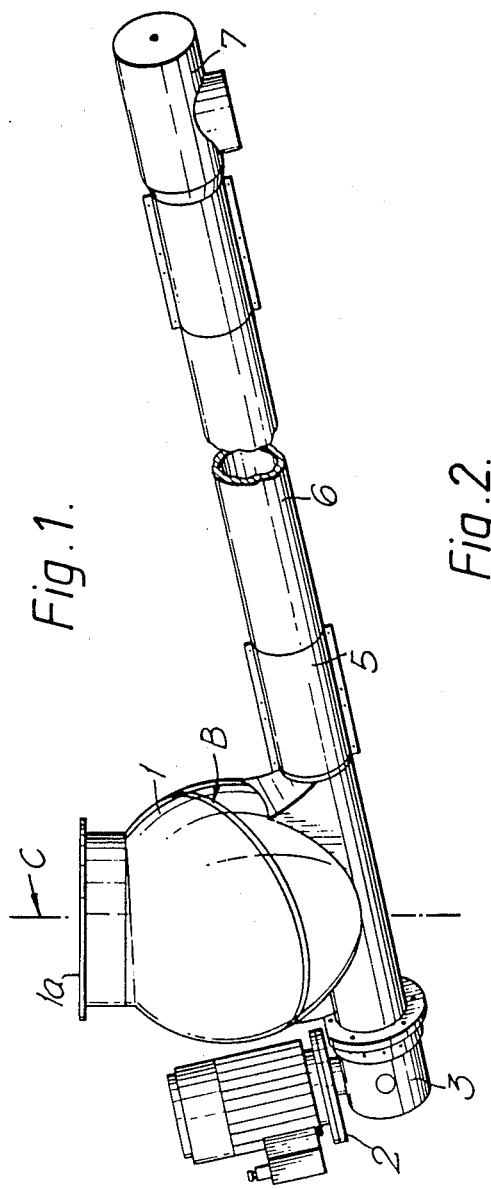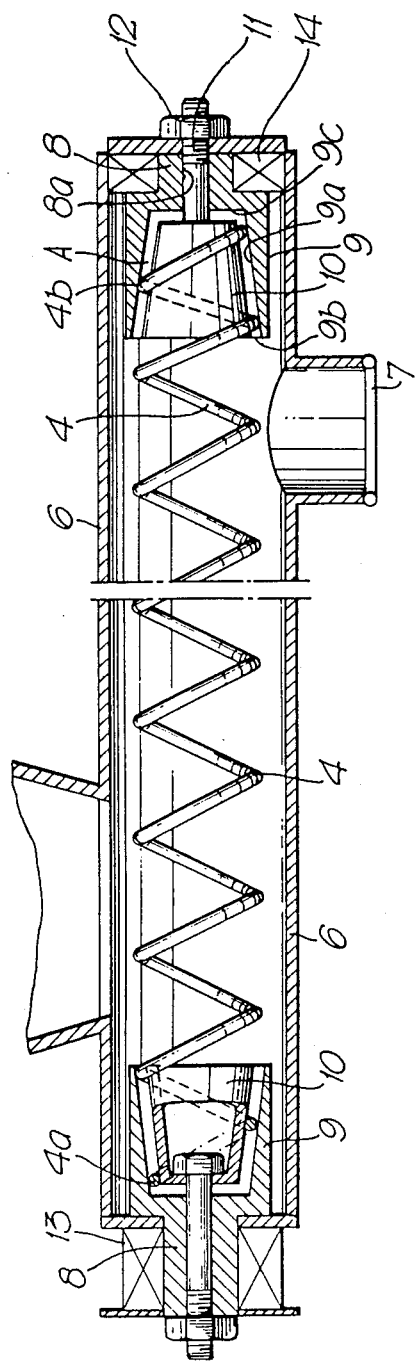

CLAMPING MEANS FOR ATTACHING THE ENDS OF A CONVEYOR COIL SPRING TO A JOURNAL PIN

The present invention relates to a clamping means for attaching the end/ends of a conveyor coil spring, e.g. to a journal pin in a conveyor tube. The invention especially relates to attaching the conveyor coil spring inside a conveyor tube to advance pellets or another granulated material from an inlet in the conveyor tube to an outlet at its other end. Previously, the conveyor coil spring in screw conveyors of the above mentioned kind were, e.g. attached by the aid of a round body which was inserted into the end of the coil spring, and the coil spring was secured to said body by the aid of screws with disks extending through said tube and being firmly clamped by said disks against the coil screw by a nut being tightened at the other end of the screw. An example of a similar attachment of the ends of a coil spring is shown in SE Publication No. 375 962. The coil spring is in this case clamped to the surface of a round body which constitutes an axle journal, by the aid of a bolt having a radial hole in the bolt head and extending through a radial hole in the axle journal, and is provided with a nut at its other end. The axle journal is provided with a recess for the bolt head so that, when the spring is inserted into said hole, the bolt head will urge the spring onto the surface of the journal when the bolt nut is tightened. Another securing device is shown in DE Publication No. 26 26 196. An axle journal is in this case provided with two radial projections at some mutual distance to receive a coil spring that is inserted on the axle journal. One projection has a through threaded hole for a set screw which, when tightened will clamp the coil spring against the other projection. A firm hold and turning of the coil spring is, thus, ensured by turning the journal. Both first mentioned devices for attaching conveyor coil springs, e.g. to journal pins, comprise projections which will influence the granulated material or pellets to be conveyed, and may crush them when the coil spring is rotated to be used as a conveyor coil spring in a screw conveyor. This is also the case with the last mentioned device for attachment, even though the mentioned radial projetions on the journal do not extend much beyond the circumference of the coil spring. The mentioned devices for attachment, as well as other and similar devices show projetions which will influence the granulated material or pellets to be conveyed and may crush them when the conveyor coil spring is rotated. It is an object of the present invention to provide a clamping means for attaching the ends of a conveyor coil spring, where there are no radially projecting members that might cause grinding or crushing as mentioned of the particulate material to be conveyed. According to the invention this is achieved by the characterizing features of the following independent claim 1, and of the following dependent claims.

An embodiment of the invention will be disclosed in more detail below with reference to the drawing, in which FIG. 1 shows a screw conveyor for pellets or particulate material, manufactured by the Applicant, and FIG. 2 shows the new clamping device for attaching the conveyor coil spring in a longitudinal section through the conveyor tube of the screw conveyor shown in FIG. 1.

FIG. 1 shows a screw conveyor, known per se, and comprising a spherical chamber 1 with an inlet 1a for granulated material or pellets. To the bottom of chamber 1 a screw conveyor tube 6 is secured with conveyor coil spring 4 having its ends rotatably attached to the ends of the screw conveyor. The screw conveyor also comprises a driving motor 2 which is connected with conveyor coil spring 4, via a worm gear 3, and an outlet 7 at the free end of screw conveyor tube 6. If desired, the screw conveyor tube may be extended by the aid of split extension sleeves 5 which clamp and hold adjacent tube ends. Spherical chamber 1 is divided along an equatorial line B in such a manner that upper portion of chamber 1 with inlet 1a can be turned relative to lower portion which is attached to screw conveyor tube 6. Due to the fact that equatorial line B lies in a plane forming an angle with the screw conveyor tube the angle of inclination of the screw conveyor tube can be changed by turning the chamber halves relative to each other. When the screw conveyor is at the same time swingable about a vertical line C screw conveyor tube 6 with outlet 7 can be positioned as desired. Ends 4a, 4b of conveyor coil spring 4 are attached to journal pins 8 by the aid of clamping devices 9,10, as shown in FIG. 2. The clamping device comprises a clamping sleeve 9 with inner walls 9a converging from opening 9b towards the other end 9c of clamping sleeve 9 which is attached to journal pin 8. A wedge shaped clamping member 10 for insertion in clamping sleeve 9 is at its narrow end provided with a screw bolt 11 which extends through and projects from an axial bore 8a in journal pin 8. A nut 12 is provided on the free end of screw bolt 11. Together, clamping sleeve 9 and clamping member 10 form an annular space A for receiving and fastening end 4a,4b of conveyor coil spring 4 by tightening nut 12 which causes the wedge shaped clamping member 10 to be pulled into clamping sleeve 9 and to clamp ends 4a,4b of conveyor coil spring 4 against the converging inner walls 9a of clamping sleeve 9. Journal pins 8 are mounted in bearings 13,14 at opposite ends of screw conveyor 6. As will appear from FIG. 2 clamping sleeve conists of a cup with a conical space, and with journal pin projecting from the bottom 9c of the cup. Clamping member 10 also consists of a cup with a conical outside, and cups 9,10, preferably have equal conical angles. To mount conveyor coil spring 4 in the clamping device, clamping sleeve 9 is at first inserted into end 4a,4b of conveyor coil spring 4. Then the spring ends 4a,4b with clamping member 10 are inserted into opening 9b of clamping sleeve 9, at the same time as screw bolt 11 is inserted into bore 8a of the journal pin. Then nut 12 is mounted on screw bolt 11 and is tightened to achieve the above mentioned clamping of end 4a,4b, resp. of conveyor coil spring 4. The screw bolt 11 may obviously, be so long that clamping sleeve 9 and clamping member 10 form a unit with clamping member 10 projecting from opening 9b of clamping sleeve 9. In this case attachment of the ends 4a,4b of conveyor coil spring 4 may be obtained in the same manner as mentioned above. Clamping member 10, preferably, has a largest diameter at its free end equal to or slightly smaller than the inner diameter of conveyor coil spring 4, whereas the largest inner diameter of clamping sleeve 9 is equal to or slightly larger than the outer diameter of conveyor coil spring 4. Provided that the ends 4a,4b of conveyor coil spring 4 receive a slightly reduced diameter when inserted into clamping sleeve 9 together with clamping member 10 due to forced engagement with the converging wall faces 9a of clamping sleeve 9, clamping member 10 will contact the inside of spring ends 4a,4b and push and urge them into engagement with the inside of clamping sleeve 9. In order to ensure that clamping member 10, in fact, contacts coil spring ends 4a, 4b the largest diameter of clamping member 10 can, however, be slightly larger than the inner diameter of conveyor coil spring 4. For mounting, clamping member 10 must then be inserted into spring end 4a, 4b with simultaneous rotation of the spring to increase its diameter.

A simple clamping device for attaching conveyor coil spring 4 ends 4a,4b is, thus, achieved by the aid of components which have quite smooth and even outside faces not causing any grinding or crushing of the particulate material which is conveyed by conveyor coil spring 4 in screw conveyor 6 from chamber 1 to outlet 7.

Having described my invention, I claim:

1. A clamping apparatus for attaching at least one end of a conveyor coil spring to a journal pin in a conveyor tube, characterized in a clamping sleeve with inner walls converging from an opening at one end of the sleeve towards another end of the clamping sleeve and being secured to the journal pin, and a wedge shaped clamping member for insertion into the clamping sleeve, a screw bolt which is secured to the narrow end of the clamping member and extends through, and projects from an axial bore in the journal pin, and a nut on a free end of the screw bolt, said clamping sleeve and the clamping member together forming an annular space for receiving and fixing the end of the conveyor coil spring when the nut is tightened.

2. A clamping apparatus as defined in claim 1, characterized in that the clamping sleeve consists of a cup with a conical space, and with the journal pin projecting from bottom of the cup, and that the clamping member also consists of a cup with a conical outside, said cups having equal conical angles.

3. A clamping apparatus as defined in cliam 1, characterized in that the largest diameter of the clamping member is at least equal to the inside diameter of the conveyor coil spring.

4. A clamping apparatus as defined in claim 3, characterized in that opening of the clamping sleeve is at least equal to the outside diameter of the conveyor coil spring.

* * * * *